(12) United States Patent
Stamenkovic

(10) Patent No.: US 8,533,970 B2
(45) Date of Patent: Sep. 17, 2013

(54) APPARATUS FOR MEASURING OBJECTS

(75) Inventor: Milan Stamenkovic, Stuttgart (DE)

(73) Assignee: Stotz Feinmesstechnik GmbH (DE)

( * ) Notice: Subject to any disclaimer, the term of this patent is extended or adjusted under 35 U.S.C. 154(b) by 192 days.

(21) Appl. No.: 13/081,247

(22) Filed: Apr. 6, 2011

(65) Prior Publication Data

US 2011/0247228 A1 Oct. 13, 2011

(30) Foreign Application Priority Data

Apr. 9, 2010 (DE) .......................... 10 2010 014 328
Jul. 12, 2010 (DE) .......................... 10 2010 026 892

(51) Int. Cl.
*G01B 13/16* (2006.01)

(52) U.S. Cl.
USPC ............................................. 33/559; 33/556

(58) Field of Classification Search
USPC .............................. 33/503, 556, 558, 559, 561
See application file for complete search history.

(56) References Cited

U.S. PATENT DOCUMENTS

| | | | | |
|---|---|---|---|---|
| 4,377,911 A * | 3/1983 | Iida et al. | ......................... | 33/561 |
| 4,769,763 A * | 9/1988 | Trieb et al. | ..................... | 702/168 |
| 4,882,848 A * | 11/1989 | Breyer et al. | ................... | 33/559 |
| 5,083,379 A * | 1/1992 | Enderle et al. | ................... | 33/556 |
| 5,088,208 A * | 2/1992 | Wells et al. | ...................... | 33/559 |
| 5,152,072 A * | 10/1992 | McMurtry et al. | .............. | 33/558 |
| 5,174,039 A | 12/1992 | Murai | | |
| 5,404,650 A | 4/1995 | Lindner | | |
| 5,414,940 A * | 5/1995 | Sturdevant | ...................... | 33/559 |
| 5,473,822 A * | 12/1995 | Struble | ............... | 33/559 |
| 5,737,244 A * | 4/1998 | Ruck | ............................. | 702/153 |
| 5,979,070 A * | 11/1999 | Lau | ................................. | 33/559 |
| 7,685,733 B2 * | 3/2010 | Ohmori et al. | .................. | 33/559 |
| 2009/0172962 A1 * | 7/2009 | Aubele et al. | ................... | 33/556 |
| 2009/0235397 A1 | 9/2009 | Hon et al. | | |

FOREIGN PATENT DOCUMENTS

| | | |
|---|---|---|
| DE | 2007614 A1 | 10/1971 |
| DE | 3420139 A1 | 6/1985 |
| DE | 3627651 A1 | 2/1988 |
| DE | 102007062679 A1 | 6/2009 |
| EP | 1793197 A2 | 6/2007 |

OTHER PUBLICATIONS

German Search Report dated Jun. 9, 2011.

* cited by examiner

*Primary Examiner* — Christopher Fulton
(74) *Attorney, Agent, or Firm* — Cantor Colburn LLP

(57) ABSTRACT

An apparatus for measuring objects, in particular to a coordinate measuring unit, is provided. The unit has a probe which is movable relative to an object to be measured by means of an actuator to sample the surface of the object in a contacting manner, wherein a sampling body, whose front end is designed as a measuring tip for a contact with the object is supported at the probe. The relative position of the measuring tip with respect to the probe is determined. The sampling body is supported at the probe with movement play along at least one direction. A change in the inclination of the sampling body relative to the probe, or vice versa, can be detected via a measurement of a test parameter.

24 Claims, 7 Drawing Sheets

APPARATUS FOR MEASURING OBJECTS

CROSS-REFERENCES TO RELATED APPLICATIONS

This patent application claims the benefit of priority to German Patent Application Serial No. 102010014328.6, filed Apr. 9, 2010, and claims the benefit of priority to German Application Serial No. 102010026892.5, filed Jul. 12, 2010, each of which are incorporated herein by reference in their entirety.

FIELD OF THE INVENTION

The invention relates to an apparatus for measuring objects, in particular to a coordinate measuring unit. The unit has a probe which is movable relative to an object to be measured by means of an actuator. The probe samples the surface of the object in a contacting manner, wherein a sampling body, in particular an elongate sampling body, whose front end is designed as a measuring tip for a contact with the object is supported at the probe and the relative position of the measuring tip with respect to the probe is determined.

BACKGROUND OF THE INVENTION

An apparatus for measuring objects is used to determine geometrical parameters of workpieces. In particular sensing balls can be provided as measuring tips. It is possible to distinguish between switching systems and measuring systems with the probes of conventional coordinate measuring units. In the switching systems, an electrical contact is opened or closed in the probe by a sampling of the object surface by the sampling body and the contact is thereby detected. Switching systems can be manufactured simply and inexpensively. However, a point can only be sampled once in one direction. For a further sampling, the electrical contact has to be set into its original state again, that is the sampling body has to be returned to its original position again, whereby a time delay occurs. The measuring systems have a separate 3D measuring system in the probe by which the position of the measuring tip relative to the probe can be determined. Capacitive sensors or strain gages can in particular be provided. The measuring tip can thus continuously remain in contact with the object to be measured during the measuring procedure. A continuous measurement is thereby possible. Coordinate measuring units with a measuring probe are therefore in particular suitable for scanning applications.

Probes for object measurement apparatus of the described kind are usually designed for a sampling force of 0.08 N to 1 N. Measurements with particularly small sensing balls—e.g. with sensing balls of less than 0.5 mm diameter—and with particularly thin sampling bodies—e.g. with sampling bodies which are thinner than 0.3 mm—are thereby made difficult. An undesirably poor repetition precision can in particular result in the measurement by a bending of the sampling body used.

SUMMARY OF THE INVENTION

Accordingly, it is desirable to provide an improved apparatus for the sampling measurement of objects which increases measurement repetition precision with relatively small sampling forces.

In accordance with an exemplary embodiment of the invention, an apparatus for measuring objects having a probe is provided. The probe is movable relative to an object to be measured by means of an actuator to sample the surface of the object in a contacting manner. A sampling body whose front end is designed as a measuring tip for a contact with the object is supported at the probe and means are provided to determine the relative position of the measuring tip with respect to the probe. The sampling body is supported at the probe with movement play along at least one direction. Further, means are provided by which a movement of the sampling body relative to the probe, or vice versa, can be detected via a measurement of a test parameter.

In a further embodiment the sampling body is supported at the probe with movement play along at least one direction and, displaceable in inclination. Means are provided by which a movement, in particular a change in the inclination, of the sampling body relative to the probe, or vice versa, can be detected via a measurement of a test parameter. The probe with the sampling body can be moved in a manner known by means of the actuator to bring the sampling body into contact with the object to be measured, e.g. a workpiece. When the measuring tip of the sampling body comes into contact with the workpiece, a change in position of the sampling body in its support and where applicable a deformation of the sampling body result per se result on a further movement of the actuator. Such a movement of the sampling body or of parts thereof can be detected in that the test parameter is measured and is evaluated accordingly. This means that the movement of the sampling body is not detected in a direct manner, for instance, in that e.g. an electric switch is opened or closed by the sampling body itself, but a metrologically detectable test parameter is monitored which is in relationship with the position of the sampling body. The relative position of the sampling body within the movement play can then be determined via the test parameter.

In another exemplary embodiment, the test parameter is a spacing of the sampling body from a reference point. The reference point can be associated with the probe, that is e.g. it can be located at the inner wall of a mount for the sampling body. On a movement of the sampling body relative to the stationary reference point, the spacing and thus the test parameter changes, which can be determined by an evaluation device.

In accordance with a further embodiment, the sampling body is supported in a mount of the probe. A reliable support—capable of being movable in a plurality of directions—of the sampling body in the probe is thereby possible.

In yet another embodiment, the apparatus is configured for measuring the spacing between two wall sections of the object to be measured. Accordingly, a change in the position of the measuring tip relative to the probe is determined by measurement of the test parameter. Such a movement of the measuring tip relative to the probe means an abutment at a wall section of the object to be measured. An oppositely disposed wall section of the object can then be traveled to by the actuator until the sampling body abuts this wall section, which is again determined via the movement of the measuring tip relative to the probe. The spacing between the two oppositely disposed wall sections of the object is calculated from the covered path of the actuator. The evaluation of the measured signals and the calculation of the wall spacing can take place by a control device by means of suitable software. In this manner, the invention enables the reliable and precise determination of wall spacings e.g. to determine the diameter and the quality of bores.

In accordance with still another embodiment of the invention, measuring devices are provided in the probe which are configured to detect the position of the sampling body in at least two different measurement planes extending transversely to a longitudinal axis of the sampling body. The difference between the positions in the respective measurement planes is dependent on the inclination of the sampling body so that a change in the inclination of the sampling body is easily detectable via the position data in the two measurement planes.

According to still yet another embodiment, the sampling body can have a cylindrical or parallelepiped-shaped support section which is received with movement play in a cut-out of the probe which is in particular open at one side. The sampling body can in particular be inserted into the cut-out from above. In accordance with a specific embodiment, the support section has a square cross-section. A parallelepiped support section with a particular square cross-section can be produced simply and inexpensively since no circular grinding procedure is necessary. The cut-out can likewise be cylindrical or parallelepiped-shaped so that the movement play results from the difference of the diameters of the support section and the cut-out. A cut-out in the sense of the invention is also to be understood as recesses at multiple sides or sections of a wall of the sampling body which spring back, that is e.g. also a corner cut-out.

In a particular exemplary embodiment, the means for detecting a movement, in particular a change in inclination, preferably include at least one pneumatic measuring nozzle which opens into a cut-out of the sampling body. In this embodiment, the position change of the sampling body relative to the probe is not, as in the prior art, detected capacitively or by means of strain gages, but rather by means of a pneumatic measuring head. I.e. the position of the measuring tip is measured internally using a pneumatic length measurement system. The use of the pneumatic measuring principle allows smaller sampling forces, and in one embodiment sampling forces of less than 0.01 N, by the regulation of the supply air pressure. Smaller sampling bodies can therefore be used. Only a relatively small deformation of the—usually thin—sampling body furthermore occurs due to the pneumatic measuring principle. Smaller workpieces can also be measured with respect to common processes. Furthermore, the pneumatic process is characterized by a high stability and good repetition precision. A further advantage of the pneumatic measurement is that the system is substantially maintenance-free. On use of a pneumatic measuring nozzle, the air pressure represents the test parameter.

In accordance with yet still another embodiment, two respective pneumatic measuring nozzles which are arranged offset with respect to one another about the longitudinal axis are provided in at least one measurement plane, and in an exemplary embodiment, in two measurement planes, spaced apart from one another and extending transversely to a longitudinal axis of the sampling body. In this manner, the two-dimensional position of the sampling body can be determined in the respective measurement plane, that is the X and the Y coordinate. The inclination or a change in inclination of the sampling body can be easily determined by pneumatic measurements in two measurement planes spaced apart from one another.

In accordance with yet still a further embodiment, at least one pair of mutually oppositely disposed pneumatic measuring nozzles is provided, and in an alternative embodiment, two pairs offset with respect to one another about the longitudinal axis. A specific position of the sampling body can be set via the ratio of the air pressures of the two oppositely disposed measuring nozzles. Conversely, the instantaneous position of the sampling body results from the ratio of the air pressures. In this embodiment, the ratio of the air pressure therefore represents the test parameter.

The means for detecting a change in inclination can also include at least one arrangement of a pneumatic measuring nozzle opening into the cut-out and of a support element projecting from an inner wall of the mount. The support element can form an abutment for the sampling body so that an oppositely disposed measuring nozzle can be saved.

In a further exemplary embodiment of the invention at least one pneumatic measuring nozzle opening into a cut-out of the sampling body is, on the one hand, provided in at least two measurement planes spaced apart from one another with respect to a longitudinal axis of the sampling body and, on the other hand, a support element projecting from an inner wall of the cut-out is provided between the two measurement planes. The sampling body is therefore supported in the manner of a rocker, with the inclination of the sampling body depending on the ratio of the forces to which the sampling body has been subjected on the respective sides of the support element. This force ratio in turn results directly from the ratio of the air pressures of the respective measuring nozzles.

Each measuring nozzle can be associated with a controllable compressed air supply. The sampling force can thus be controlled via the air pressure supplied to the respective measuring nozzle.

It is contemplated that in another embodiment, a pneumo-electrical converter can be associated with each measuring nozzle which generates a measured signal dependent on the position of the sampling body in the cut-out in dependence on an air pressure of the measuring nozzle. The electrical measured signal can be used as a test parameter and can be further processed in a variety of manners.

In a particular exemplary embodiment, an electronic evaluation unit is provided which determines the position, in particular the inclination, of the sampling body relative to the probe, using the generated measured signals. This allows a fast measurement of objects, in particular also in a scanning mode.

In accordance with another further exemplary embodiment, the sampling body is supported in a floating manner on a flow of air in a mount of the probe during the operation of the measurement apparatus. Complex plain bearings or roller element bearings which are prone to error can thereby be saved. In addition, a substantially friction-free movability of the probe in the mount is achieved.

In yet another embodiment, at least one upwardly directed air outlet nozzle can be provided in the mount for the floating support of the sampling body. An air outlet nozzle for generating an air cushion for supporting the sampling body can be provided in the base of the mount. Depending on the requirement, a plurality of upwardly directed air outlet nozzles can also be provided.

The air outlet nozzle can be a pneumatic measuring nozzle which is configured to determine the height of the sampling body supported in a floating manner in the mount. Such a nozzle therefore serves both for supporting the sampling body on a flow of air and for the position determination.

The above advantages and features will become more apparent from the following description taken in conjunction with the drawings.

BRIEF DESCRIPTION OF THE DRAWINGS

The invention will be described by way of example in the following with reference to the drawings.

DETAILED DESCRIPTION

Figure 1:
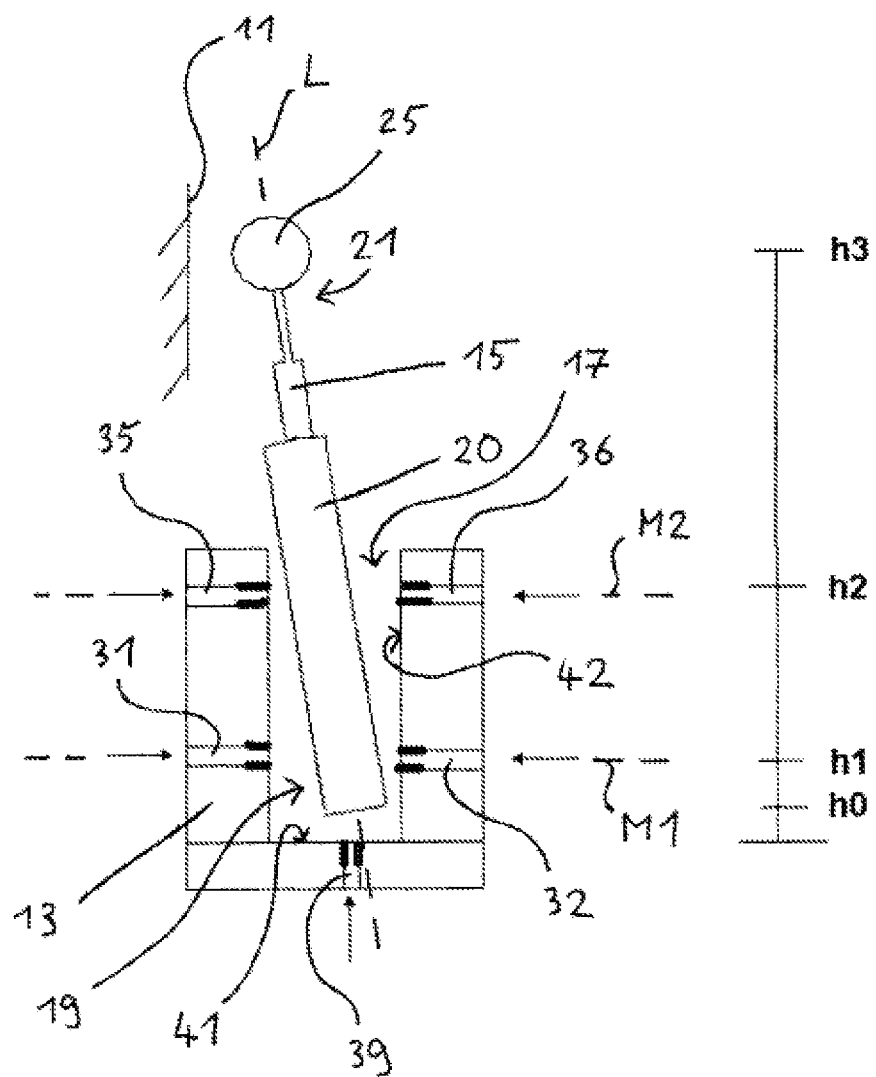
FIG. 1 is a simplified representation of an object measurement apparatus in accordance with an embodiment of the invention.
Figure 2:
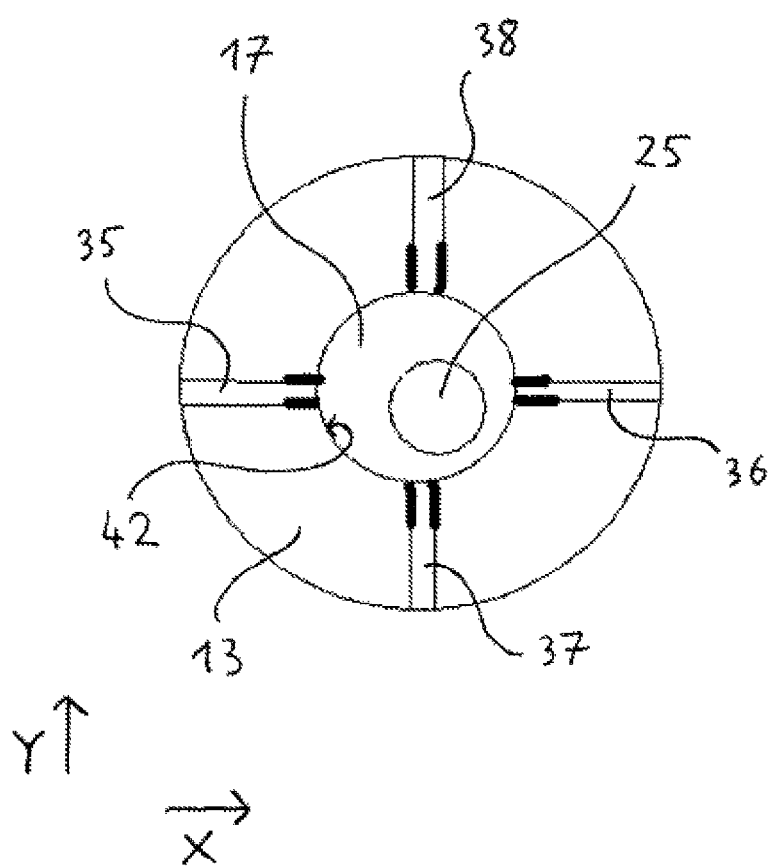
FIG. 2 is a plan view of an object measurement apparatus in accordance with FIG. 1.

Referring now to the Figures, where the invention will be described with reference to specific embodiments, without limiting same, FIGS. 1 and 2 show an exemplary embodiment of the invention. A coordinate measuring unit for measuring a workpiece 11 includes a probe 13 and an actuator, not shown, by means of which the probe 13 can be moved relative to the workpiece 11. The actuator can be a driven triaxial adjustment system such as a 3D slide.

A sampling body 15 having a longitudinal axis L is inserted from above into a cut-out 17 of the probe 13 open at one side and is supported with movement play therein. The cut-out 17 has a cylindrical inner wall 42 and a base 41. The sampling body 15 is fixedly connected at its rear or lower end 19 to a cylindrical bearing element 20 which is inserted into the cut-out 17. A sensing ball 25 which forms a measuring tip for a contact with the workpiece 11 is provided at the front or upper end 21 of the sampling body 15.

The probe 13 is provided with pneumatic nozzles 31-39 which open into the interior of the cut-out 17. Each of the measuring nozzles 31-39 is connected to a separate pneumoelectric converter (not shown), e.g. in accordance with DIN 2771. The pneumoelectric converters deliver respective output voltages which are simultaneously evaluated in an evaluation unit likewise not shown. Furthermore, a controllable compressed air supply, not shown, is associated with each measuring nozzle 31-39.

Four measuring nozzles 31-34 are arranged in a first measurement plane M1 extending transversely to the longitudinal axis L of the sampling body 15, with in each case two mutually opposite measuring nozzles forming a measuring nozzle pair and the two measuring nozzle pairs being offset to one another by 90° with respect to the longitudinal axis L within the measurement plane M1. In a similar manner, in a second measurement plane M2, which extends parallel to the first measurement plane M1 and is spaced apart therefrom in the direction of the longitudinal axis L, two measuring nozzle pairs of mutually oppositely disposed measuring nozzles 35-38 are arranged. Furthermore, an upwardly directed measuring nozzle 39 is provided in the base of the cut-out 17.

The relative position of the sampling body 15 relative to the probe 13 is measured in the measurement plane M1 and in the measurement plane M2 by means of the pneumatic measuring nozzles 31-39. The position of the bearing element 20 in an X direction toward the height h1 predefined by the measurement plane M1 is specifically measured using the measuring nozzles 31, 32. The position of the bearing element 20 in a Y direction toward the height h1 is accordingly measured by means of the measuring nozzles 33, 34. In a similar manner, the position of the bearing element 20 at the height h2 predefined by the measurement plane M2 in the X direction and in the Y direction is measured by means of the measuring nozzles 35-38. The measuring nozzle 39 allows the floating support of the sampling body 15 on the upwardly blown air flow. In addition, the height position h0 of the sampling body 15 is determined by means of the measuring nozzle 39, the height position corresponding to the spacing of the sampling body 15 from the base 41 of the cut-out 17.

It is possible, by adaptation of the air pressure conditions in the measuring nozzles 31-38 in the two measurement planes, to determine the inclination of the support element 20 and thus of the sampling body 15 and to achieve a predefined pretension. The three-dimensional position of the center of the sensing ball 25 relative to the probe 13 can in turn be determined from the inclination of the sampling body 15. For this purpose, in particular the geometrical circumstances of the sampling body 15, in particular of the bearing element 20 and of the sensing ball 25, as well as the operating parameters of the measuring nozzles 31-39 must be taken into account. A sampling of a measured object can be detected via an inclination change.

Figure 3:
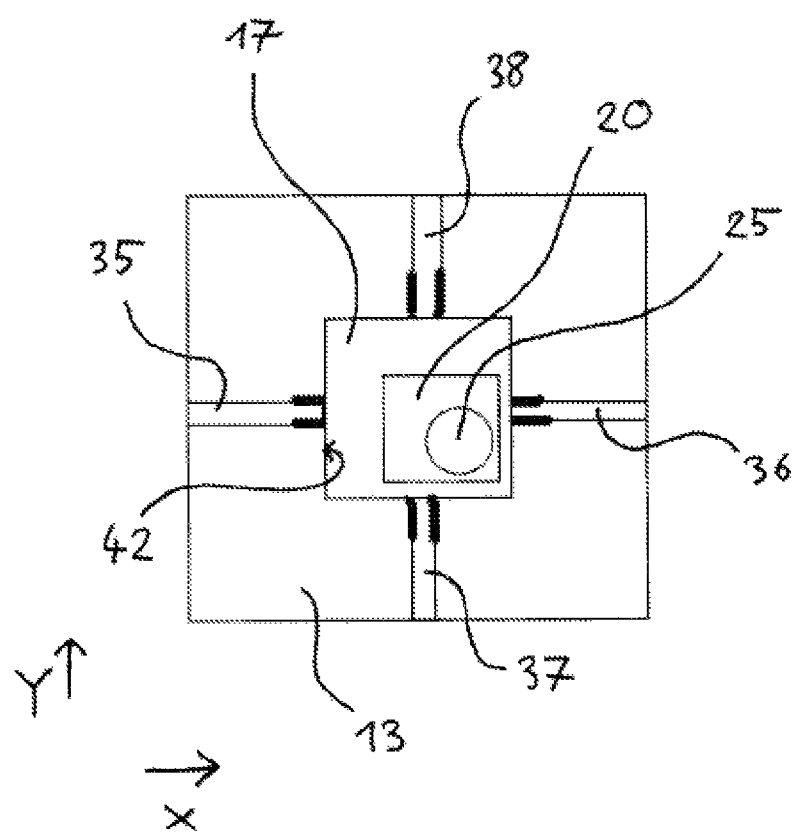
FIG. 3 is a plan view of an object measurement apparatus in accordance with another embodiment of the invention.

FIG. 3 shows another exemplary embodiment of the invention in which both the bearing element 20 and the cut-out 17 have a square cross-section. This in particular allows a reduction of the manufacturing costs in comparison with a round embodiment.

Figure 4:
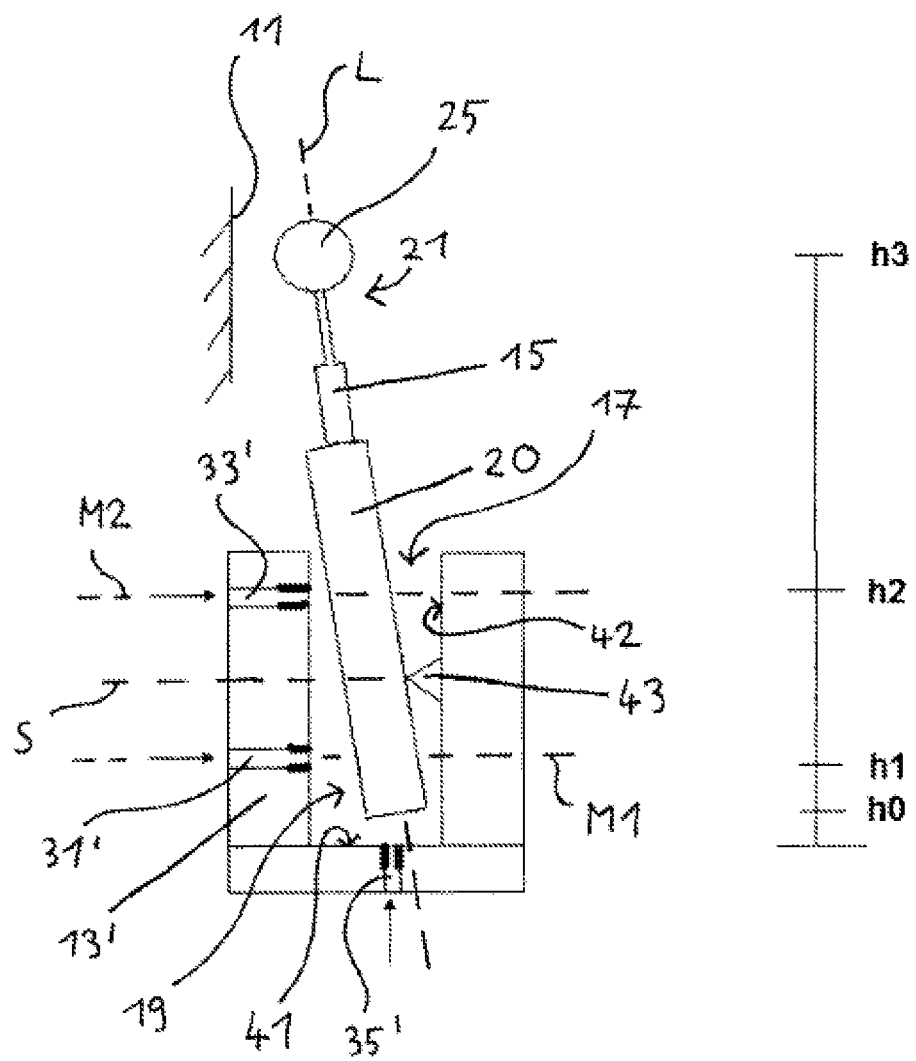
FIG. 4 is a simplified representation of an object measurement apparatus in accordance with yet another embodiment of the invention.
Figure 5:
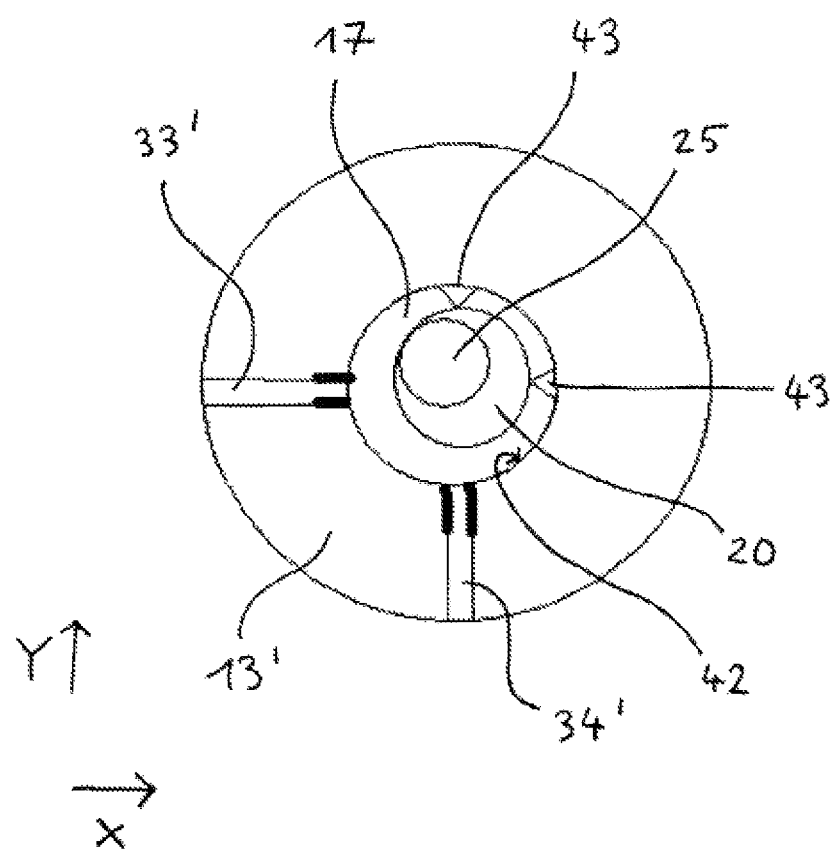
FIG. 5 is a plan view of an object measurement apparatus in accordance with FIG. 4.

Alternative to the embodiments in accordance with FIGS. 1, 2 and 3, in accordance with FIGS. 4 and 5, a probe 13' can be used in which only 5 measuring nozzles 31'-35' are provided. Two support elements 43 projecting from the inner wall 42 of the cut-out 17 are provided in a common support plane S which is arranged between the measurement planes M1, M2 and parallel thereto. The bearing element 20, which is again cylindrical here, lies on the support elements 43 and has a specific air pressure applied in each case at both sides of the support point. The inclination of the bearing element 20 is in direct relationship with the ratio of the air pressures above and below the support plane S. In this embodiment, a desired pretension or a desired sampling force can thus also be set in this embodiment by adaptation of the air relationships, that is by a suitable control of the supply air pressure of the individual measuring nozzles 31'-34'. In addition, the inclination of the sampling object 15 can again be determined from the air pressure relationships and thus a sampling at a measured object can be determined.

Figure 6:
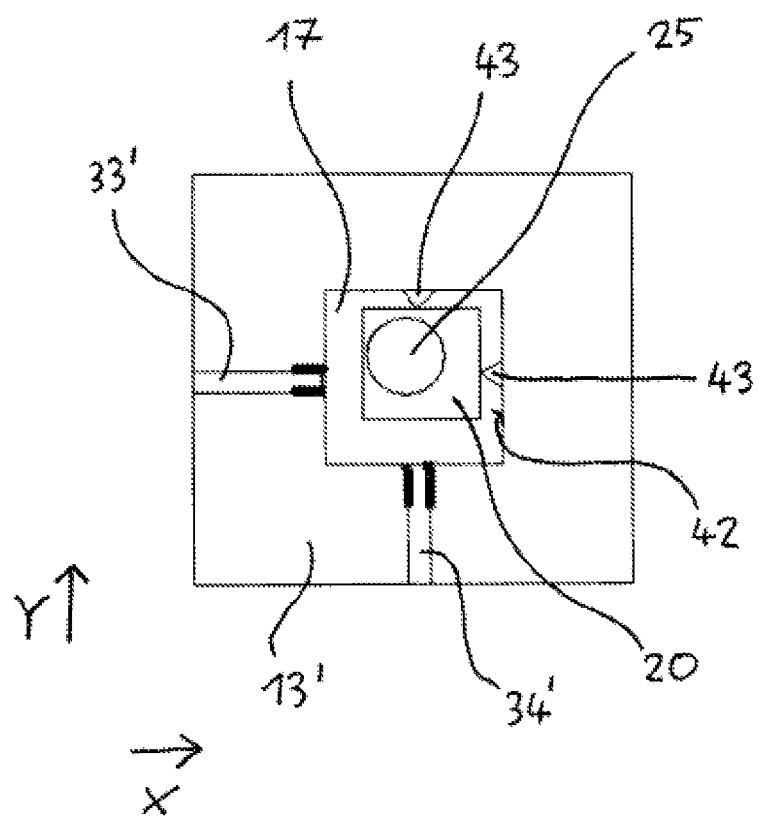
FIG. 6 is a plan view of an object measurement apparatus in accordance with still yet another embodiment of the invention.

FIG. 6 shows yet another exemplary embodiment in which, similar to the embodiment in accordance with FIGS. 4 and 5, support elements 43 for the bearing element 20 are provided. As in the embodiment in accordance with FIG. 3, both the bearing element 20 and the cut-out 17 have a square cross-section.

Figure 7:
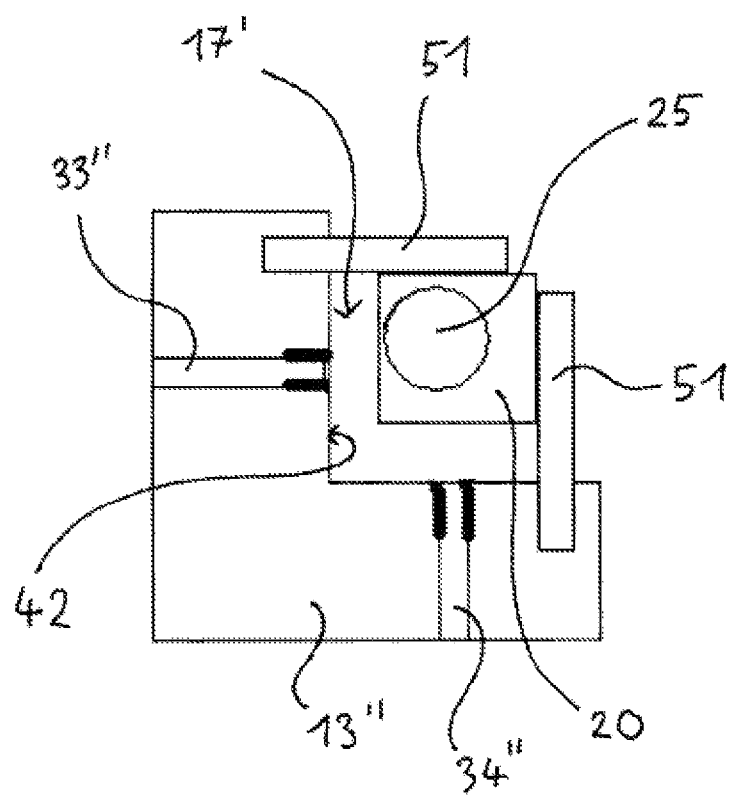
FIG. 7 is a plan view of an object measurement apparatus in accordance with yet still another embodiment of the invention.

In accordance with the embodiment shown in FIG. 7, the cut-out 17' is formed as a corner cut-out open at a plurality of sides in an L-shaped probe 13''. The bearing element 20 having a square cross-section, here is supported by two support bars 51 which extend in the horizontal direction from the inner wall 42 of the cut-out 17'. As in the embodiment in accordance with FIGS. 4 and 5, the bearing element 20 has a controlled air pressure applied at both sides of the support point by means of pneumatic measuring nozzles 31''-34''. The embodiment in accordance with FIG. 7 allows a particularly simple construction.

Overall, the invention allows a sampling measurement of objects with a particularly high reproducibility with relatively small sampling forces.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An apparatus for measuring objects, the apparatus having a probe which is movable relative to an object to be measured by means of an actuator to sample the surface of the object in a contacting manner,
   wherein a sampling body whose front end is designed as a measuring tip for a contact with the object is supported at the probe and means are provided to determine the relative position of the measuring tip with respect to the probe,
   wherein the sampling body is supported at the probe with movement play along at least one direction; and
   wherein means are provided by which a movement of the sampling body relative to the probe, or vice versa, can be detected via a measurement of a test parameter, wherein the means for detecting a movement, in particular a change in inclination, include at least one pneumatic measuring nozzle which opens into a cut-out of the sampling body.

2. An apparatus in accordance with claim 1, wherein said apparatus is a coordinate measuring unit.

3. An apparatus in accordance with claim 1, wherein said sampling body is an elongate sampling body.

4. An apparatus in accordance with claim 1, wherein said movement play along at least one direction includes a changeable inclination.

5. An apparatus in accordance with claim 4, wherein a movement of the sampling body relative to the probe includes a change in the inclination.

6. An apparatus in accordance with claim 1, wherein the test parameter is a spacing of the sampling body from a reference point.

7. An apparatus in accordance with claim 1, wherein the sampling body is supported in a mount of the probe.

8. An apparatus in accordance with claim 1, wherein measuring apparatus are provided in the probe to detect the position of the sampling body in at least one measurement plane extending transversely to a longitudinal axis of the sampling body and wherein measuring apparatus are provided in the probe which are designed to detect the position of the sampling body in two different measurement planes extend transversely to a longitudinal axis of the sampling body.

9. An apparatus in accordance with claim 8, wherein said measuring apparatus are able to continuously detect the position of the sampling body.

10. An apparatus in accordance with claim 1, wherein the sampling body has a cylindrical-shaped, or a parallelepiped-shaped, bearing section which is received with movement play in a cut-out of the probe, with the sampling body being inserted into the cut-out from above.

11. An apparatus in accordance with claim 10, wherein said cut-out is open at one side.

12. An apparatus in accordance with claim 1, wherein two respective pneumatic measuring nozzles arranged offset from one another about the longitudinal axis are provided in at least one measurement plane extend transversely to a longitudinal axis of the sampling body, and/or wherein two respective pneumatic measuring nozzles arranged offset from one another about the longitudinal axis are provided in two measurement planes spaced apart from one another and extend transversely to a longitudinal axis of the sampling body.

13. An apparatus in accordance with claim 1, wherein at least one pair of mutually opposite pneumatic measuring nozzles, arranged offset from one another about the longitudinal axis, are provided or wherein two pairs of mutually opposite pneumatic measuring nozzles are arranged offset from one another.

14. An apparatus in accordance with claim 1, wherein the means for detecting a movement include an arrangement of a pneumatic measuring nozzle opening into the cut-out and of a support element projecting from an inner wall of the mount.

15. An apparatus in accordance with claim 14, wherein the means for detecting a movement detects a change in inclination.

16. An apparatus in accordance with claim 1, wherein a controllable compressed air supply is associated with each measuring nozzle.

17. An apparatus in accordance with claim 1, wherein a pneumo-electric converter configured to generate a measured signal dependent on the position of the sampling body in the cut-out, in dependence on an air pressure of the measuring nozzle, is associated with each measuring nozzle.

18. An apparatus in accordance with claim 17, wherein an electronic evaluation unit is provided which determines the position of the sampling body relative to the probe with reference to the generated measured signals.

19. An apparatus in accordance with claim 18, wherein said electronic evaluation unit continuously determines the position of the sampling body relative to the probe.

20. An apparatus in accordance with claim 18, wherein said evaluation unit determines the inclination of the sampling body relative to the probe.

21. An apparatus in accordance with claim 1, wherein the sampling body is supported in a floating manner on a flow of air in a mount of the sampling head during the operation of the measurement apparatus.

22. An apparatus in accordance with claim 21, wherein at least one upwardly directed air outlet nozzle is provided in the mount for the floating support of the sampling body.

23. An apparatus in accordance with claim 22, wherein the air outlet nozzle is designed as a pneumatic measuring nozzle which is designed to determine the height of the sampling body supported in a floating manner in the mount.

24. An apparatus for measuring objects, the apparatus having a probe which is movable relative to an object to be measured by means of an actuator to sample the surface of the object in a contacting manner,
   wherein a sampling body whose front end is designed as a measuring tip for a contact with the object is supported at the probe and means are provided to determine the relative position of the measuring tip with respect to the probe,
   wherein the sampling body is supported at the probe with movement play along at least one direction; and
   wherein means are provided by which a movement of the sampling body relative to the probe, or vice versa, can be detected via a measurement of a test parameter,
   wherein at least one pneumatic measuring nozzle opening into a cut-out of the sampling body is provided in each of at least two measurement planes spaced apart from one another with respect to a longitudinal axis, and a support element projecting from an inner wall of the cut-out is provided between the two measurement planes.

\* \* \* \* \*